United States Patent [19]
Suzuki et al.

[11] Patent Number: 5,392,068
[45] Date of Patent: Feb. 21, 1995

[54] IMAGING APPARATUS HAVING START-OF-IMAGING SIGNAL DEPENDENT COLOR TEMPERATURE MEASUREMENT FOR WHITE-BALANCE

[75] Inventors: Masahiro Suzuki, Kawasaki; Koichiro Kawamura, Chiba; Satoshi Ejima, Tokyo, all of Japan

[73] Assignee: Nikon Corporation, Tokyo, Japan

[21] Appl. No.: 113,826

[22] Filed: Aug. 31, 1993

[30] Foreign Application Priority Data

Sep. 4, 1992 [JP] Japan .................. 4-262852
Sep. 8, 1992 [JP] Japan .................. 4-265494

[51] Int. Cl.⁶ .......................... H04N 9/73
[52] U.S. Cl. ...................... 348/227; 348/224; 358/909.1; 358/906
[58] Field of Search ............ 358/29, 29 C, 41, 909, 358/906, 44, 43, 909.1; H04N 9/73, 9/73 C; 348/223, 224, 227, 222, 266, 272

[56] References Cited

U.S. PATENT DOCUMENTS

| 4,774,564 | 9/1988 | Konishi | 358/29 |
| 4,827,332 | 5/1989 | Miyake | 358/29 |
| 4,879,591 | 11/1989 | Takei | 358/29 C |
| 4,947,242 | 8/1990 | Hieda | 358/29 |
| 5,021,874 | 6/1991 | Tsugita | 358/29 |
| 5,065,232 | 11/1991 | Kondo | 358/29 C |

FOREIGN PATENT DOCUMENTS 3320690 12/1983 Germany.

OTHER PUBLICATIONS

Patent Abstracts of Japan, vol. 15, No. 397, (E-1120) 8 Oct. 1991 (only abstract).

Primary Examiner—James J. Groody
Assistant Examiner—Sherrie Hsia
Attorney, Agent, or Firm—Shapiro and Shapiro

[57] ABSTRACT

A still-picture imaging apparatus includes a manually operable photography starting switch to output a start-of-imaging signal. A control circuit operates dependent upon the start-of-imaging signal to actuate an image pick up device and a color measuring sensor, which measures color temperature for purposes of white-balancing. The control circuit may control an adjuster to adjust white-balance of an image signal from the image pick up device based on a color temperature signal from the color measuring sensor.

16 Claims, 9 Drawing Sheets

IMAGING APPARATUS HAVING START-OF-IMAGING SIGNAL DEPENDENT COLOR TEMPERATURE MEASUREMENT FOR WHITE-BALANCE

BACKGROUND OF THE INVENTION

1. Field of the Invention

The present invention relates to a still-picture imaging apparatus suitable for use with, e.g., an electronic still video camera.

2. Related Background Art

Human eyes have an adaptability to recognize a color of a white subject as white even when the light with which a field is irradiated changes. Contrastingly, for instance, in an electronic still video camera, if the irradiation light ambient to the field changes, the color also changes. Then, it is required that a white-balance be adjusted.

Figure 4:
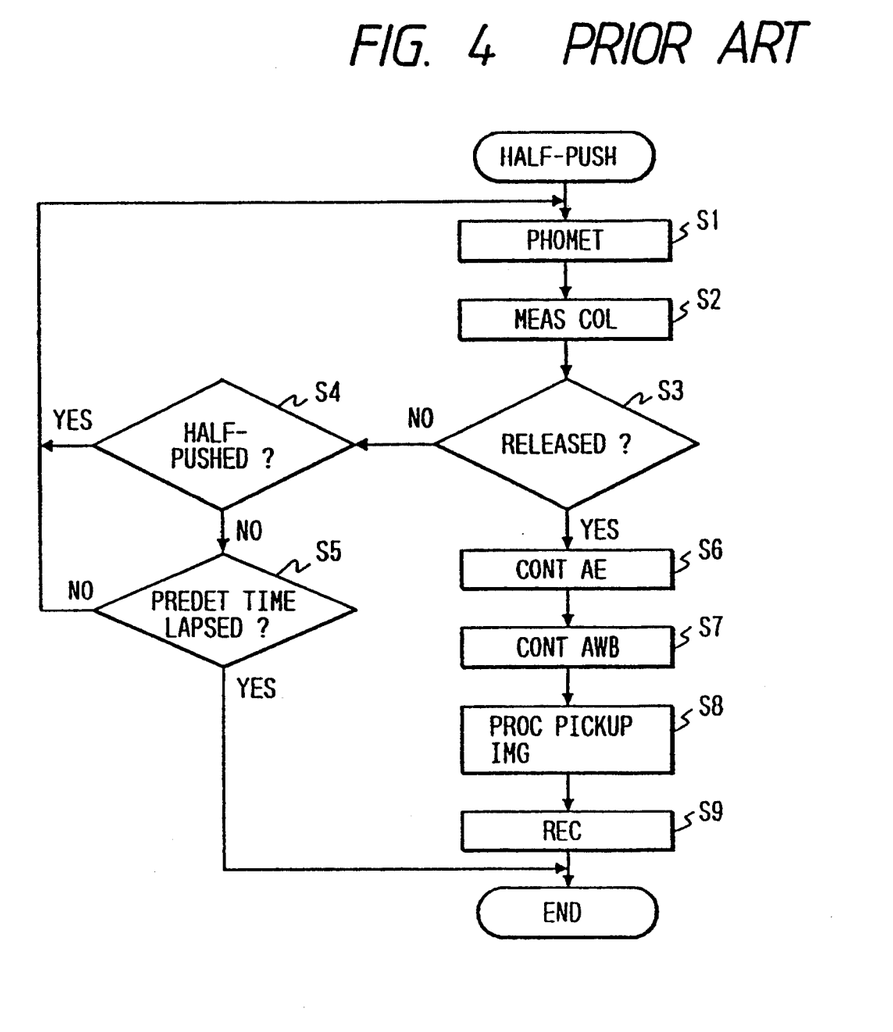
FIG. 4 is an explanatory flowchart showing the operation in a conventional electronic still video camera.

FIG. 4 shows processing in a conventional electronic still video camera. This processing starts with bringing a release button (unillustrated) of the electronic still video camera into a half-pushed state. Then, photometry is conducted in step S1. That is, a brightness of a field is detected. Next in step S2, a color measuring process is performed; i.e., a color temperature ambient to the field is measured. After effecting these two processes, the action proceeds to step S3. Whether or not the release button is finally turned ON (the release button is full-pushed) is judged.

When the release button is not yet full-pushed, the action proceeds to step S4. Whether or not the half-pushed state is kept is judged. If the half-pushed state is kept, the action goes back to step S1. The actions after step S1 are repeatedly executed. In step S4, if the half-pushed state is canceled, the action further proceeds to step S5. In step S5, if is judged whether or not a predetermined time (e.g., 16 seconds) has elapsed since the half-pushed state was canceled. Then, if the predetermined time has not yet passed, the action returns to step S1. Namely, even when the half-pushed state is canceled, the half-pushed state is substantially held for 16 seconds. In step S5, if the predetermined time has elapsed, the action is ended.

In step S3, if the release button is judged to be full-pushed, the action proceeds to step S6. The AE control is performed corresponding to a photometric result obtained in step S1. That is, an aperture and a shutter speed are set to predetermined values, and an exposure action is executed. The action next proceeds to step S7, wherein the white-balance is controlled. To be more specific, the white balance is adjusted corresponding to the color measured result given in step S2. Thereafter, the action goes to step S8 where imaging process is executed, and the data read from an image sensing device (not shown) such as a CCD are converted into video signals. Then, the action further proceeds to step S9, wherein the video data are recorded on a video floppy disk (magnetic disk).

The conventional apparatus is constructed with a flash device which illuminates the field with a flash of light. In this apparatus, a memory previously stores items of white-balance adjusting data for adjusting the white-balance in the case of employing the flash device. The white-balance is adjusted corresponding to the data stored in this memory when using the flash device.

In the conventional apparatus, as explained above, when half-pushing the release button, the photometric and color measuring actions are repeated. This results in an increase consumption of the electric power. Consequently, there arises a problem in that the battery is quickly consumed particularly in an apparatus of such a type that the color is measured by use of an imaging portion, the electric power consumed during the color measurement becomes remarkably larger than in the case of providing a color measuring element for an exclusive use. The consumption of the electric power is large enough not to be ignorable.

Further, according to the conventional apparatus, the white-balance is adjusted corresponding to the data stored beforehand in the memory in the case of using the flash device. In practice, however, color temperature differs among different types of flash devices. This therefore leads to such a problem that the white-balance is hard to adjust accurately. Especially in the case of taking a shot by employing the flash device when the external light is bright, it is difficult to properly adjust the white-balance.

Still further, according to the conventional apparatus, even when immediately brought into the full-pushed state subsequent to the half-pushed state, a judgement of being in the full-pushed state is made after completing the photometric and color measuring actions. It is thus impossible to take a shot quickly, and the photographer may therefore be unable to capture a brief exposure opportunity.

SUMMARY OF THE INVENTION

It is a primary object of the present invention to provide an imaging apparatus capable of reducing the electric power consumed and capable of accurately measuring a color temperature or adjusting a white-balance.

It is another object of the present invention to provide an imaging apparatus capable of reducing the electric power consumed and capable of eliminating missed exposure opportunities.

According to a still-picture imaging apparatus of this invention, when half-pushing a release button, a photometric action is carried out. When full-pushing the release button, an exposure state is controlled corresponding to the photometric result, thereby imaging a field. A color temperature ambient to the field is measured for a duration of the exposure. After completing the imaging action, the white-balance of video signals obtained as a consequence of the imaging action is adjusted according to the measured color temperature.

According to a still-picture imaging apparatus of this invention, the photometric action is effected when half-pushing the release button. When full-pushing the release button, the exposure state is controlled corresponding to the photometric result, thereby imaging the field. When starting the exposure, the color temperature ambient to the field is measured for a predetermined period. After completing the imaging action, the white-balance of the video signals obtained as a result of the imaging action is adjusted according to the measured color temperature.

According to a still-picture imaging apparatus of this invention, when half-pushing the release button, the photometric action is conducted. When full-pushing the release button, the field is irradiated with a flash of light. Simultaneously, the exposure state is controlled corresponding to the photometric result, thereby imaging the field. The color temperature ambient to the field is measured for a duration of the irradiation of the flash of light. After completing the imaging action, the white-balance of the video signals obtained as a result of the imaging action is adjusted according to the measured color temperature.

In these still-picture imaging apparatuses, the video signals and the data on the measured color temperature can be recorded on a recording medium instead of adjusting the white-balance.

In the still-picture imaging apparatus of the present invention, after the release button has been brought into the full-pushed state, the color temperature ambient to the field is measured for a full duration of the exposure or for a predetermined period after starting the exposure. Hence, the color is not measured when half-pushing the release button. The electric power consumed can be reduced correspondingly.

Further, in the still-picture imaging apparatus of the present invention, after turning ON the release button, there is measured the color temperature ambient to the field during the irradiation of the flash of light. It is therefore possible to adjust the white-balance and accurately measure the color temperature in the case of using the flash device.

According to the still-picture imaging apparatus of this invention, when half-pushing the release button, a photometric action is carried out. When full-pushing the release button, the color temperature of the field is measured. At the same time, the exposure state is controlled corresponding to the photometric result, thereby imaging the field. After completing the imaging action, the white balance of the video signals obtained as a result of the imaging action is adjusted according to the measured color temperature.

According to the still-picture imaging apparatus of this invention, the photometric action is effected when half-pushing the release button. When full-pushing the release button, the color temperature ambient to the field is measured. Simultaneously, the exposure state is controlled corresponding to the photometric result, thereby imaging the field. After completing the imaging action, the video signals obtained as a consequence of the imaging action and the data corresponding to the measured color temperature are recorded on the recording medium.

According to the still-picture imaging apparatus of the present invention, after the release button has been put into the full-pushed state, the color temperature ambient to the field is measured. Accordingly, when the release button is in the half-pushed state, no photometric action is effected. The electric power consumed can be reduced correspondingly. Also, it is possible to take a shot quickly.

In addition, according to the still-picture imaging apparatus of the present invention, after bringing the release button into the full-pushed state, the data corresponding to the measured color temperature is recorded on the recording medium. Hence, the white-balance can be accurately adjusted by use of this item of data.

BRIEF DESCRIPTION OF THE DRAWINGS

Other objects and advantages of the present invention will become apparent during the following discussion in conjunction with the accompanying drawings, in which.

DESCRIPTION OF THE PREFERRED EMBODIMENTS

Figure 1:
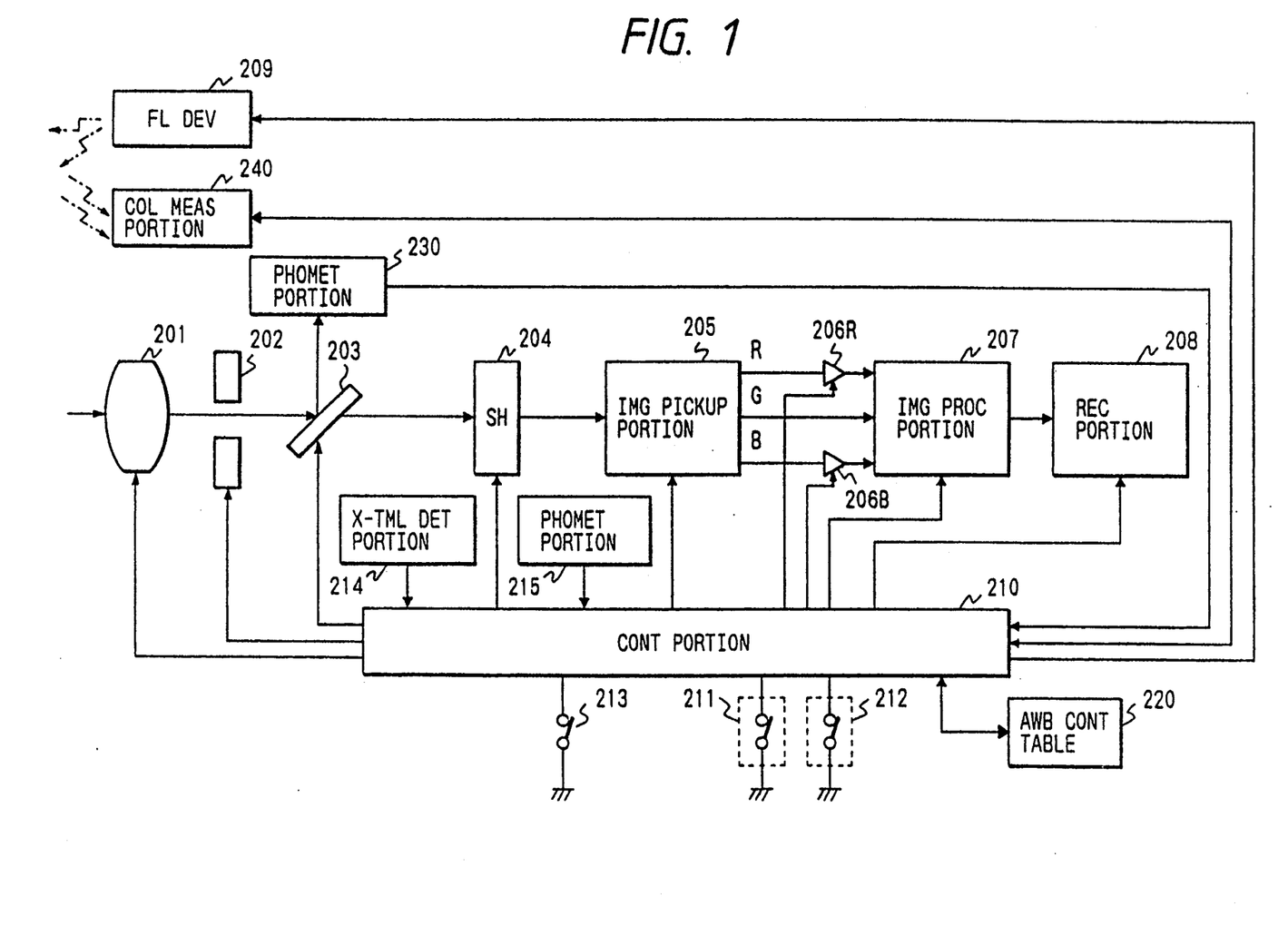
FIGS. 1 and 9 are block diagrams illustrating constructions of an electronic still video camera in embodiments of the present invention.

FIG. 1 is a block diagram illustrating a construction in one embodiment of an electronic still video camera to which a still-picture imaging method of this invention is applied. Rays of light coming from a subject (unillustrated) are incident on an imaging portion 205 via an optical member 201 consisting of lenses, a stop member 202 and a shutter 204. This imaging(image picking-up) portion 205 comprises a solid-state image sensing device consisting of, e.g., a CCD or a MOS device. The imaging portion 205 also comprises a sampling circuit for sampling output signals from this solid-state image sensing device at a predetermined timing.

The imaging portion 205 outputs R-, G- and B-signals. The R-signal among those signals is inputted to an image processing portion 207 via a variable amplifier 206R. The B-signal is supplied to the image processing portion 207 via a variable amplifier 206B. Contrastingly, the G-signal is supplied directly to the image processing portion 207. The image processing portion 207 adjusts a gain, a set-up level, gamma and knee of the inputted signals. The image processing portion 207 converts the R-, G- and B-signals into video signals and outputs these video signals to a recording portion 208. The recording portion 208 records the inputted video signals on a video floppy disk (magnetic disk) (not shown).

A microcomputer-based control portion 210 controls the optical member 201, the stop member 202, a mirror 203, the shutter 204, the imaging portion 205, the variable amplifiers 206R, 206B, the image processing portion 207 and the recording portion 208. In addition, the control portion controls a flash device 209 to irradiate the subject with a flash of light at a predetermined timing. The mirror 203 reflects, towards a photometric portion 230, the light coming from the field and incident via the optical member 201 and the stop member 202. The light thus falls on the photometric portion 230. The photometric portion 230 detects a brightness of the subject from this incident light and outputs a detected result thereof to the control portion 210. On the other hand, a photometric portion 215 receives the reflected light from the imaging portion 205 for so-called TTL control when using a strobe. The photometric portion 215 outputs a signal corresponding to the brightness of the subject during an exposure to the control portion 210.

Further, a color measuring portion 240 measures a color temperature of the subject and outputs a measured result thereof to the control portion 210. Stored in an AWB control table 220 are a color temperature detected by the color measuring portion 240 and a white-balance adjustment value corresponding thereto. The gains of the variable amplifiers 206R, 206B are controlled corresponding to the data stored in this table. An X-terminal detecting portion 214 detects a timing at which the exposure is started with tripping of a leading curtain (not illustrated) of the shutter 204. The X-terminal detecting portion 214 outputs a detection signal thereof to the control portion 210.

Further, switches 211, 212 are turned ON when a release button (unillustrated) is half-pushed and full-pushed, respectively. A switch 213 is turned ON when using the flash device 209. The control portion 210 detects a manipulated state of the release button from outputs of the switches 211, 212. The control portion 210 thus judges whether or not the flash device 209 is required to be driven from an output of the switch 213.

Next, the operation will be explained with reference to a flowchart of FIG. 2. The action shown in the flowchart starts with half-pushing the release button and turning ON the switch 211. The control portion 210 at first, when the switch 211 is turned ON, executes a photometric action in step S21. More specifically, a brightness of the field is detected by the photometric portion 230. The light coming from the field falls on the photometric portion 230 via the optical member 201, the stop member 202 and the mirror 203. The photometric portion 230 detects the brightness of the field from this incident light and outputs the detected result thereof to the control portion 210.

Judged next in step S22 is whether or not the release button is full-pushed, i.e., released (whether or not the switch 212 is turned ON). If the switch 212 is not turned ON, the action proceeds to step S23 to judge whether the release button remains half-pushed or not. If half-pushed (the switch 211 is kept ON), the action goes back to step S21, wherein the photometric action is repeated. If the half-pushed state of the release button is judged to be canceled (switch 211 turned OFF) in step S23, the action proceeds to step S24. Judged therein is whether or not a predetermined time (e.g., 16 seconds) has elapsed since the switch 211 was turned OFF. If the time has not elapsed, the action returns to step S21, where in the photometric action is repeated. If the time has elapsed, the action is ended.

In this manner, the photometric action is repeated for a duration of half-pushing of the release button or until the time of 16 seconds has elapsed after canceling the half-pushed state. Then, the photometric action (processing) is terminated just when the time of 16 seconds has elapsed after canceling the manipulation of the release button.

If the release button is judged to be full-pushed in step S22 (the switch 212 is judged to be turned ON), the action goes forward to step S25. An aperture is controlled therein. Namely, the control portion 210 sets the stop member 202 to a predetermined value corresponding to the photometric result obtained in step S21. Next, the action proceeds to step S26 where the leading curtain (not shown) of the shutter 204 is tripped, thereby starting the exposure. To be more specific, the control portion 210 at this moment causes the mirror 203 to flip up off the light path, whereby the leading curtain of the shutter 204 is tripped. The light coming from the field is thereby incident on the imaging portion 205 via the optical member 201, the stop member 202 and the shutter 204. An image of the subject is thus formed.

Further, a signal from the X-terminal is detected in step S27. The color measuring portion 240 also measures a color temperature ambient to the field at this time in step S28. The color measuring portion 240 outputs a measured result thereof to the control portion 210. That is, the control portion 210 causes, when the X-terminal detecting portion 214 outputs the detection signal of the trip of the shutter leading curtain, the color measuring portion 240 to execute a color measuring process. Then, the action proceeds to step S29. After an exposure time (shutter speed) corresponding to the photometric result obtained in step S21 has elapsed, a trailing curtain (not illustrated) of the shutter 204 is tripped, thus finishing the exposure.

The action proceeds to step S30 next to step S29, wherein the AWB control is executed. More specifically, the control portion 210 reads, from the AWB control table 220, a white-balance adjustment quantity (a gain adjustment quantity of the variable amplifiers 206R, 206B) corresponding to the color temperature outputted by the color measuring portion 240. The gains of the variable amplifiers 206R, 206B are thereby adjusted. As a consequence, the brightness data (R-, G- and B-signals) obtained in the imaging process by the solid-state image sensing device of the imaging portion 205 undergo sampling at a predetermined timing in the control portion 210. The sampled data are supplied to the image processing portion 207.

The G-signal among the R-, G- and B-signals outputted by the imaging portion 205 is supplied directly to the image processing portion 207. The R- and B-signals are, however, adjusted to the gains set by the variable amplifiers 206R, 206B and supplied to the image processing portion 207. Next, the action proceeds to step S31. The image processing portion 207 processes and converts the R-, G- and B-signals of which the white balances are adjusted into video signals. Then, the action goes further to step S32 where a recording process is executed. That is, the control portion 210 at this moment controls the image processing portion 207 and the recording portion 208 as well. The video signals outputted from the image processing portion are thereby FM-modulated and recorded on the video floppy disk.

Note that in the embodiment discussed above, after tripping the leading curtain in step S26, the color measuring process is executed in step S28 during a period until the trailing curtain is tripped in step S29. As a result, it follows that a color measurement operating time varies corresponding to an operating time (shutter speed) of the shutter 204. Of course, the process may be such that after the leading curtain has been tripped in step S26, the color measuring process in step S28 is executable for only a predetermined time.

Next, the operation in the case of employing the flash device will be explained with reference to a flowchart of FIG. 3. Processes of steps S41 through S47 are the same as those of steps S21 through S27 in FIG. 2.

The switch 213 is turned ON. If it is commanded beforehand that the flash device 209 be used, the control portion 210 moves, after detecting the signal from the X-terminal in step S47, to step S48 where flash control is executed.

More specifically, the control portion 210 calculates an aperture and a shutter speed corresponding to the photometric result given in step S41. The aperture is set in step S45, while the shutter speed is set in step S50 (tripping of the trailing curtain) which will be mentioned later as well as in step S46 (tripping of the leading curtain). These values are, however, set corresponding to the result of the photometry effected in a non-flashed state. The flash device 209 is therefore controlled to adjust a flashing quantity so that a proper exposure is performed with the set aperture at the set shutter speed.

The control portion 210 further controls, after proceeding to step S49, the color measuring portion 240 to execute the measurement of a color ambient to the field irradiated with a flash of light at a high speed. As a result, the color measurement corresponding to the flash of light actually employed can be conducted irrespective of a driving voltage and a type of the lamp used for the flash device 209.

The action proceeds to step S50 next, where the trailing curtain is tripped and the exposure is completed. The processes of steps S51 through S53 subsequent to step S50 are the same as those of steps S30 through S32 in FIG. 2.

In the above-mentioned embodiment, the white-balance is adjusted by the variable amplifiers 206R, 206B, and thereafter the adjusted video signals are recorded on the video floppy disk. However, the video signals processed by the image processing portion 207 can be also recorded directly on the video floppy disk through the recording portion 208 without adjusting the white-balance by the variable amplifiers 206R, 206B. At this time, the white-balance adjusting data (e.g., gain adjustment quantities of the variable amplifiers 206R, 206B, or color temperature data themselves) outputted by the control portion 210 are correspondingly recorded on the video floppy disk. In this case, when regenerating the data from the video floppy disk, the white-balance is adjusted according to the color temperature data recorded on this video floppy disk.

Further, in the embodiment discussed above, the arrangement is such that the mechanical shutter 204 is disposed in front of the imaging portion 205. The present invention is, however, applicable to an apparatus for controlling the exposure time through an electronic shutter.

As discussed above, according to the still-picture imaging apparatus of this invention, after bringing the release button into the full-pushed state, the white-balance of the video signals is adjusted corresponding to the color temperature measured for a full duration of the exposure or for a predetermined time in the exposure. Hence, when the half-pushing the release button, the color measuring action is not executed, and the electric power consumed can be reduced correspondingly. As a result, a life-span of the battery can be increased.

Further, according to the still-picture imaging apparatus of the present invention, the color measuring action is executed for a duration of flashing after full-pushing the release button. It is therefore possible to detect an accurate color temperature corresponding to the flash of actually irradiated light. Accordingly, the white-balance can be accurately adjusted.

Moreover, according to the still-picture imaging apparatus of this invention, after full-pushing the release button, the data corresponding to the measured color temperature is recorded on the recording medium. The white-balance can be therefore accurately adjusted by use of this item of data.

Next, another embodiment of the present invention will be described with reference to FIG. 5.

Figure 2:
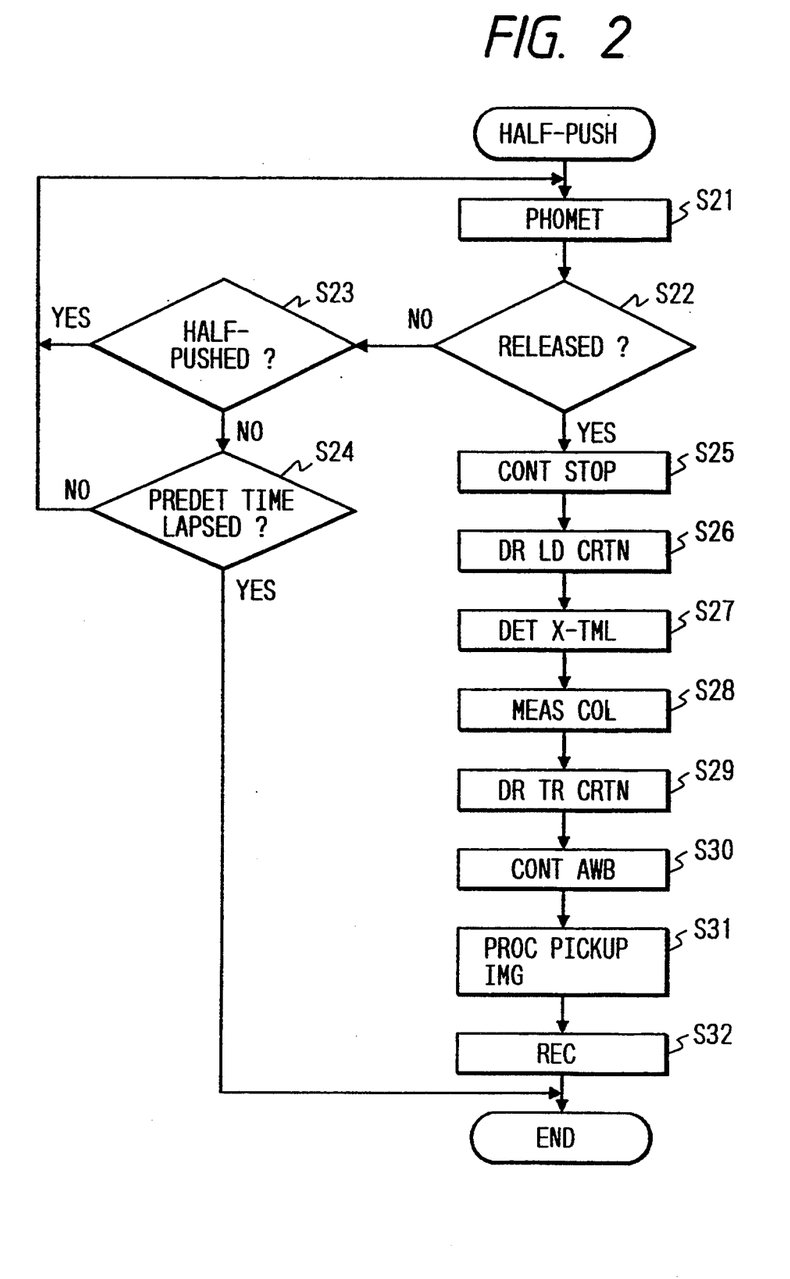
FIG. 2 is an explanatory flowchart showing the operation in the embodiment of FIG. 1.
Figure 5:
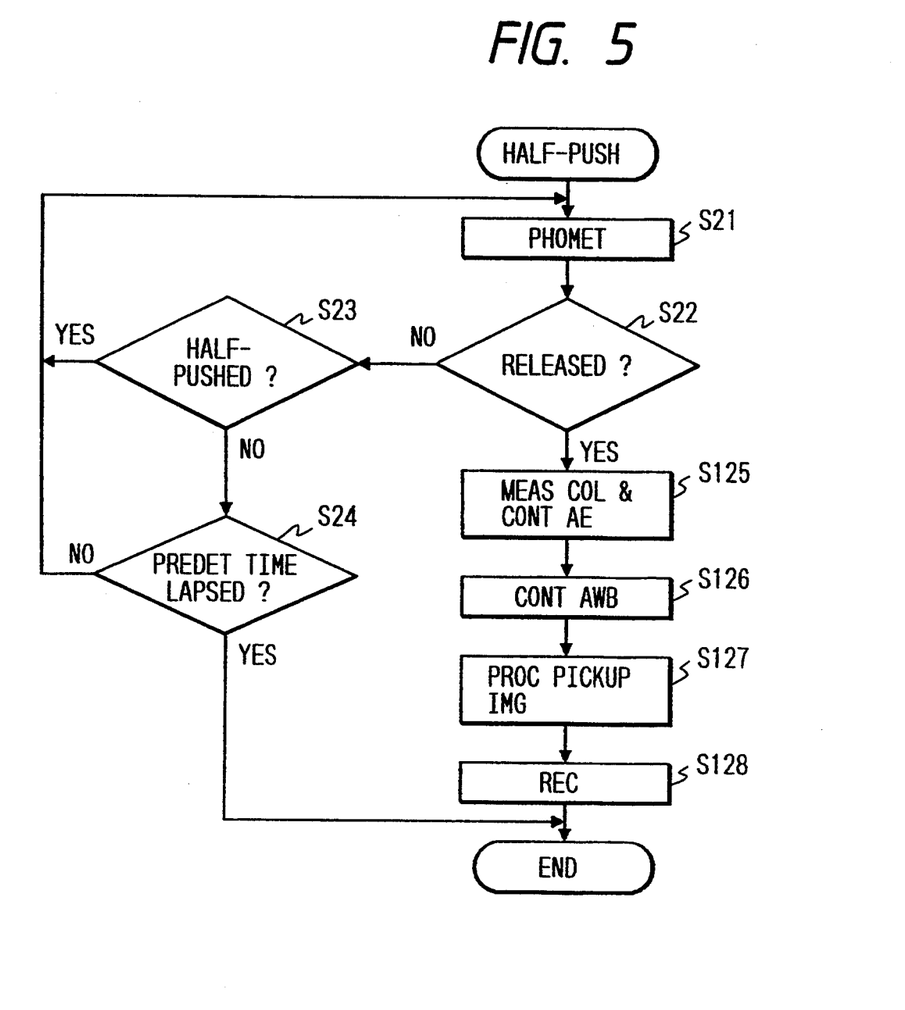
FIG. 5 is an explanatory flowchart showing the operation in another embodiment.

Note that the actions up to step S22 in FIG. 5 are the same as those in the embodiment of FIG. 2. Therefore, the explanation skips over the actions up to step S22 but concentrates on those after step S22.

In step S22, if the release button is judged to be full-pushed (the switch 212 is Judged to be turned ON), the action proceeds to step S125 where the color measuring action and AE control are simultaneously executed. Namely, the color measuring portion 240 measures a color temperature ambient to the field at that time and outputs a measured result thereof to the control portion 210.

Further, the control portion 210 controls the stop member 202 and a speed of the shutter 204, corresponding to the photometric result given in step S21. The exposure is thereby executed. At this moment, the control portion 210 causes the mirror 203 to flip up off the light path, thus opening the shutter 204 for a predetermined time. The light coming from the field is thereby incident on the imaging portion 205 via the optical member 201, the stop member 202 and the shutter 204.

The action proceeds to step S126 next wherein the AWB control is executed. To be more specific, the control portion 210 reads, from the AWB control table 220, the white-balance adjustment quantity (the gain adjustment quantity of the variable amplifiers 206R, 206B) corresponding to the color temperature outputted by the color measuring portion 240. The gains of the variable amplifiers 206R, 206B are thereby adjusted. As a consequence, the brightness data (R-, G- and B-signals) obtained in the imaging process by the solid-state image sensing device of the imaging portion 205 undergo sampling at a predetermined timing in the control portion 210. The sampled data are supplied to the image processing portion 207.

The G-signal among the R-, G- and B-signals outputted by the imaging portion 205 is supplied directly to the image processing portion 207. The R- and B-signals are, however, adjusted to the gains set by the variable amplifiers 206R, 206B and supplied to the image processing portion 207. Next, the action proceeds to step S127. The image processing portion 207 processes and converts the R-, G- and B-signals of which the white balances are adjusted into video signals. Then, the action goes further to step S128 where a recording process is executed. That is, the control portion 210 at this moment controls the image processing portion 207 and the recording portion 208 as well. The video signals outputted from the image processing portion are thereby FM-modulated and recorded on the video floppy disk.

In the above-mentioned embodiment, the white-balance is adjusted by the variable amplifiers 206R, 206B, and thereafter the adjusted video signals are recorded on the video floppy disk. However, the video signals processed by the image processing portion 207 can be also recorded directly on the video floppy disk through the recording portion 208 without adjusting the white-balance by the variable amplifiers 206R, 206B. At this time, the white-balance adjusting data (e.g., the gain adjustment quantities of the variable amplifiers 206R, 206B, or the color temperature data themselves) outputted by the control portion 210 are correspondingly recorded on the video floppy disk. In this case, when regenerating the data from the video floppy disk, the white-balance is adjusted according to the color temperature data recorded on this video floppy disk.

In the embodiment discussed above, the arrangement is such that the mechanical shutter 204 is disposed in front of the imaging portion 205. The present invention is, however, applicable to an apparatus for controlling the exposure time through an electronic shutter.

As discussed above, according to the still-picture imaging apparatus of this invention, after bringing the release button into the full-pushed state, the color temperature is measured. The white-balance of the video signals is adjusted according to the measured color temperature. Hence, when the half-pushing the release button, the color measuring action is not executed, and the electric power consumed can be reduced correspondingly. As a result, the life-span of the battery can be increased.

Further, there decreases a time until a judgement as to whether or not the release button is put into the half-pushed state and thereafter into the full-pushed state. A quicker shot can therefore be taken without missing an exposure opportunity.

According, to the still-picture imaging apparatus of the present invention, the color temperature is measured after full-pushing the release button, and data corresponding to the measured color temperature can be recorded on the recording medium. It is therefore possible to precisely adjust the white-balance by use of this item of data.

Figure 6:
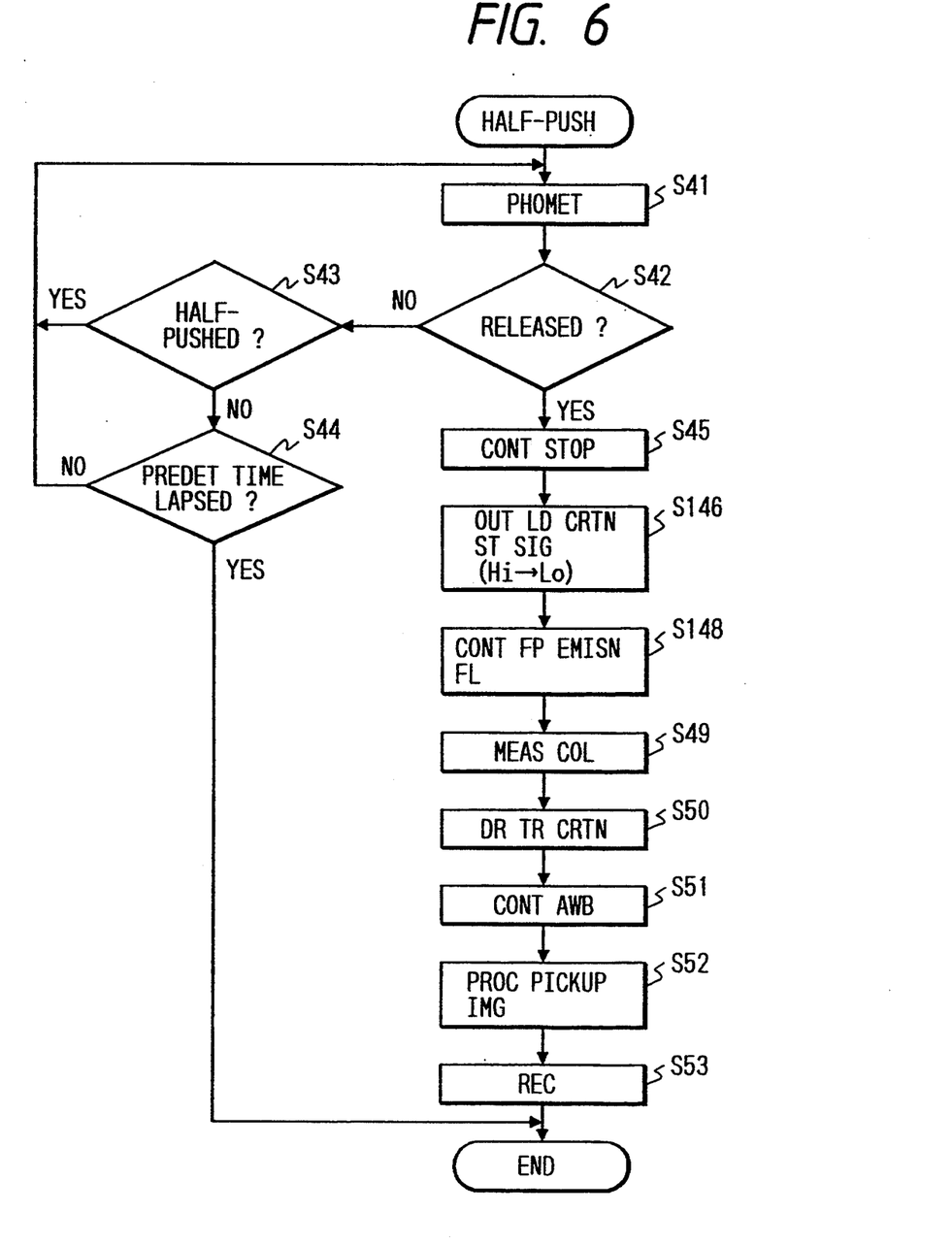
FIG. 6 is an explanatory flowchart showing the operation still another embodiment.
Figure 7:
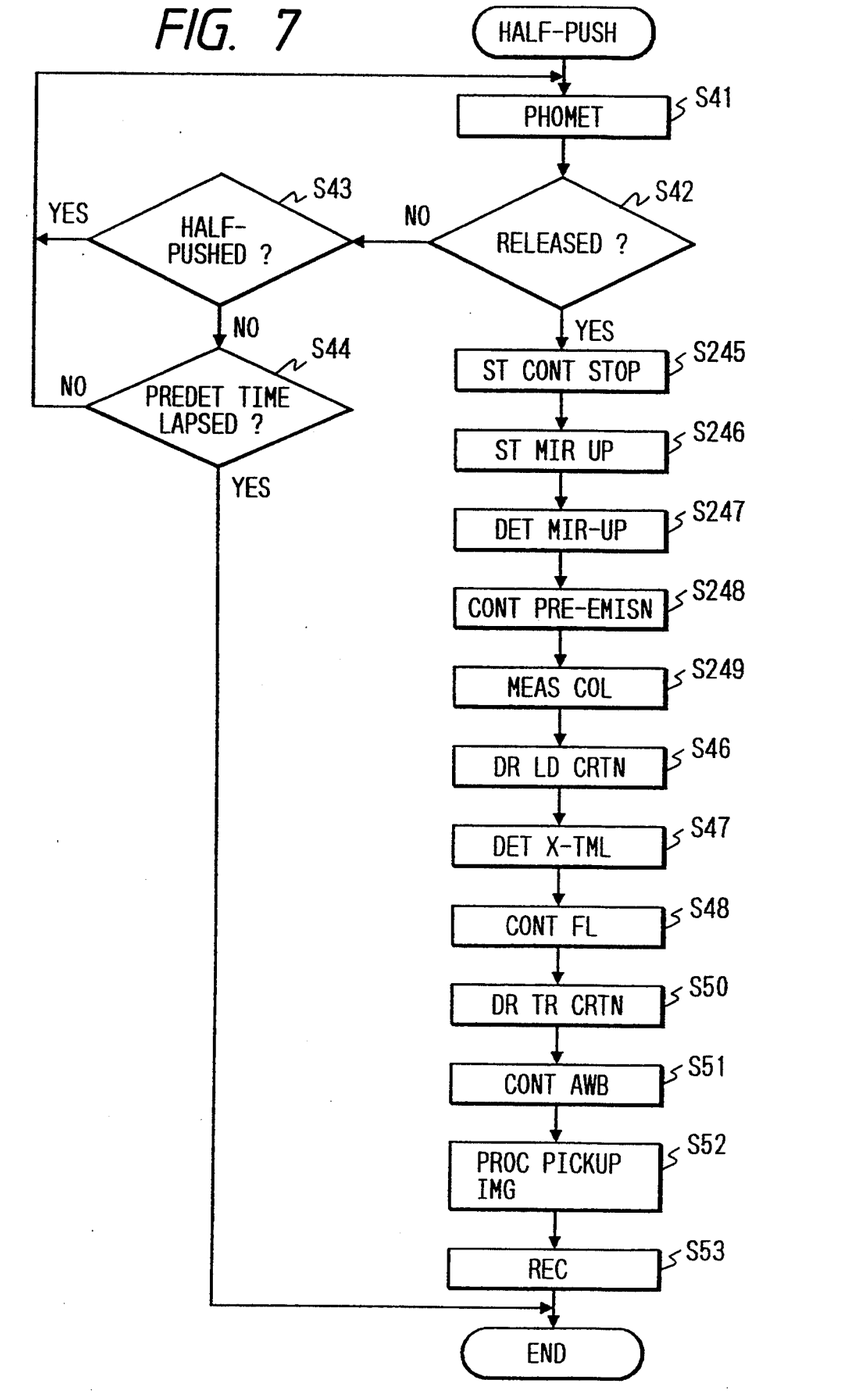
FIGS. 7, 8 and 10 are explanatory flowcharts showing the operation in a further embodiments.

The following is an explanation of still further embodiments of the present invention with reference to FIGS. 6 and 7.

Figure 3:
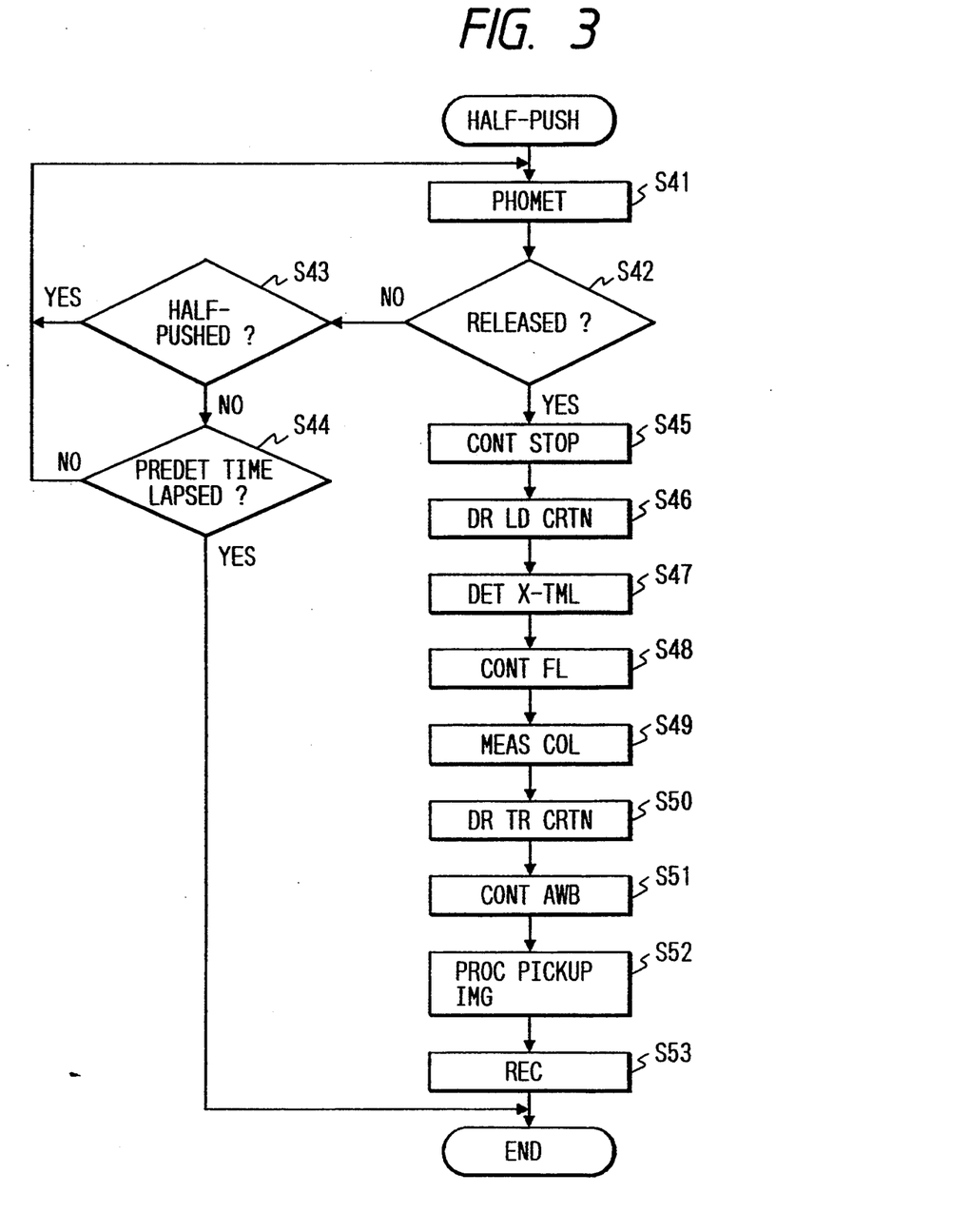
FIG. 3 is an explanatory flowchart showing other operations in the embodiment of FIG. 1.

Referring to FIG. 6, the actions up to step S45 and after step S49 are the same as those in the flowchart of FIG. 3. The explanation thereof is accordingly omitted. In step S45, the aperture is controlled, and, thereafter, a leading curtain start signal is outputted in step S146. Specifically, a start of the leading curtain is commanded corresponding not to the detection of the signal from the X-terminal but to a high-to-low variation of the leading curtain signal. FP flash is controlled in step S148 subsequent thereto.

Referring further to FIG. 7, the actions up to step S44 and after step S50 are the same as those in the flow chart of FIG. 3, and, therefore, their explanation is omitted. If judged to be released in step S42, the aperture control is started in step S245. In subsequent step S246, a mirror-up is started. With a completion thereof, a mirror-up completion signal is outputted. In step S247, the outputted mirror-up completion signal is detected. In subsequent step S248, pre-flash control is performed. In step S249, a color ambient to the field is measured based on the pre-flash. The tripping of the leading curtain is started in step S46 subsequent thereto. Main flash control is conducted (S48) with a detection of the signal from the X-terminal (S47).

Figure 8:
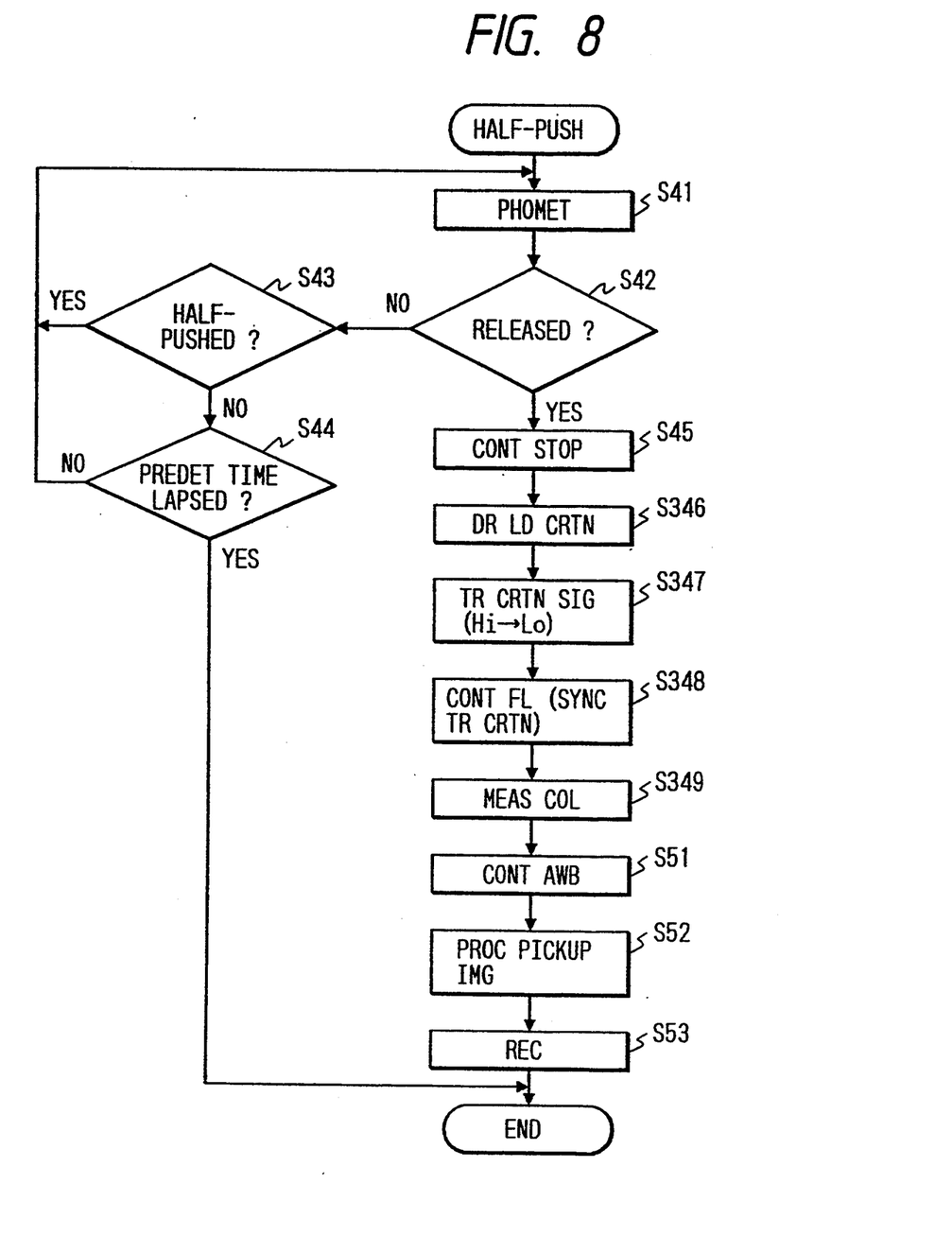

An explanation of a further embodiment of this invention is given with reference to FIG. 8, wherein the color measurement is performed during flashing by trailing curtain flash sync. Note that the actions up to step S45 and after step S51 are the same as those in the flowchart of FIG. 3, and hence the explanation thereof is omitted. After the aperture has been controlled in step S45, the leading curtain is tripped in step S346. In subsequent step S347, a trailing curtain start signal varies from high to low. In step S348, the flash control is conducted in synchronization with tripping of the trailing curtain. The color is measured in step S349.

Figure 9:
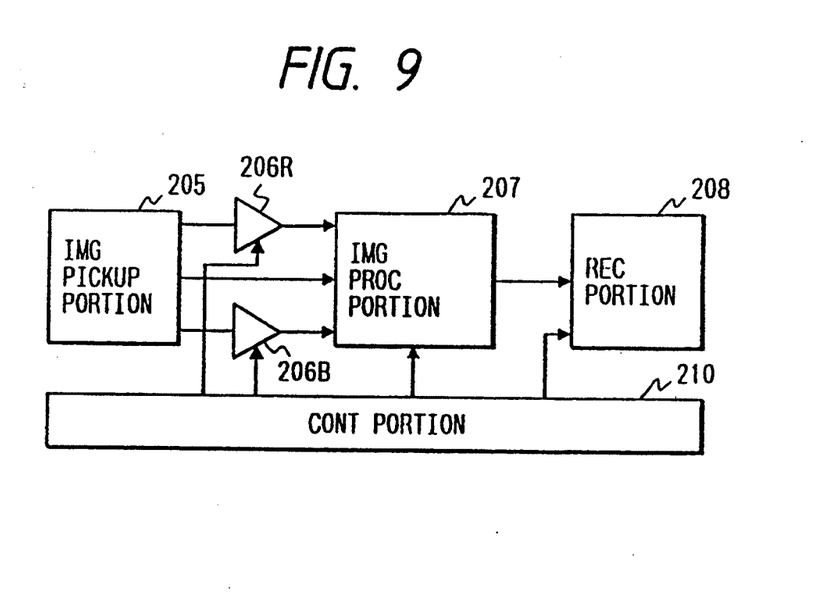

Next, another variation will be explained referring to FIGS. 9 and 10. FIG. 9 illustrates a part of variant form of the embodiment of FIG. 1. The respective components are the same as those in FIG. 1 and therefore marked with the like numerals. The explanation thereof is omitted.

Figure 10:
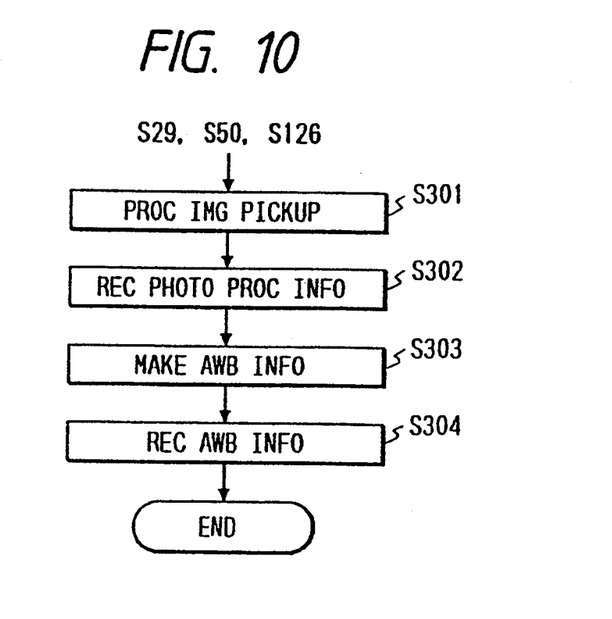

FIG. 10 is a flowchart showing an example of modification of FIGS. 2, 3 and 5. The action shifts to step S301 in FIG. 10 from the processes of steps S29, S50, S126 shown in FIGS. 2, 3 and 5.

In step S301, the R-, G- and B-signals defined as an imaging information without the white-balance are transmitted from the imaging portion 205 to the image processing portion 207. That is, the gains of the variable amplifiers 206R, 206B are set to 1. Then, the action shifts, after converting the R-, G- and B-signals into video signals, to step S302. A recording process is executed in step S302. More specifically, the control portion 210 controls the image processing portion 207 and the recording portion 208. The video signals outputted from the image processing portion 207 are FM-modulated. Then, the FM-modulated signals are recorded on the floppy disk. The action shifts to step S303.

In step S303, the control portion 210 prepares AWB information on the basis of the information outputted from the color measuring portion 240. The action then shifts to step S304. The control portion 210 supplies the recording portion 208 with the AWB information in step S304. The AWB information is recorded on the recording portion 208, thus finishing the process.

The imaging information and the AWB information are recorded on the recording portion 210 by performing the process in this mode. When regenerating a photographed result, an unillustrated photographing device adjusts the white balance based on the imaging information and the AWB information as well. Therefore, the properly color-corrected image can be regenerated without effecting even the AWB control during the imaging process.

Note that the video signals are, after being FM-modulated, recorded on the floppy disk in step S302. However, the arrangement may be such that the signals outputted from the image processing portion 207 are A/D converted, and the digital data are recorded on an opto-magnetic disk, an IC memory or other recording medium. It is apparent that a wide range of working modes can be made in keeping with principles and spirit of this invention, the scope of which is defined in the appended claims.

What is claimed is:

1. An apparatus for imaging a still-picture, comprising:
    a manually operable photography starting switch to output a start-of-imaging signal;
    an image pick up device to perform a still-picture image pick up process for picking up an image of a field and outputting an image signal;
    a color measuring sensor to measure a color temperature of an area including said field and to output a color temperature signal;
    an adjuster electrically connected to said image pick up device to adjust white-balance of said image signal; and
    a control circuit electrically connected to said photography starting switch, said image pick up device, said color measuring sensor and said adjuster, said control circuit operating dependent upon said start-of-imaging signal to actuate said image pick up device and said color measuring sensor, and controlling said adjuster based on said color temperature signal.

2. An apparatus according to claim 1, wherein said control circuit causes said color measuring sensor to measure the color temperature during the image pick up process.

3. An apparatus according to claim 1, wherein said control circuit causes said color measuring sensor to measure the color temperature for a fixed period.

4. An apparatus according to claim 1, wherein said control circuit controls said adjuster based on said color temperature signal after an end of said image pick up process.

5. An apparatus according to claim 1, further comprising a flash device to irradiate said field with a flash of light, and wherein said control circuit causes said color measuring sensor to measure the color temperature during flashing of said flash device.

6. An apparatus according to claim 1, further comprising a flash device to irradiate said field with a flash of light, and wherein said control circuit causes said flash device to perform a pre-flash prior to said image pick up process, causes said color measuring sensor to start measuring the color temperature before completion of said pre-flash, and stops said pre-flash by said flash device and the color temperature measuring by said color measuring sensor prior to said image pick up process.

7. An apparatus for imaging a still-picture, comprising:
a manually operable photography starting switch to output a start-of-imaging signal;
an image pick up device to perform a still-picture image pick up process for picking up an image of a field and outputting an image signal;
a color measuring sensor to measure a color temperature of an area including said field and to output a color temperature signal;
a recording device; and
a control circuit electrically connected to said photography starting switch, said image pick up device, said color measuring sensor and said recording device, said control circuit operating dependent upon said start-of-imaging signal to actuate said image pick up device and said color measuring sensor and to cause said recording device to record said image signal and said color temperature signal in a recording medium after said image pick up process.

8. An apparatus according to claim 7, wherein said control circuit causes said color measuring sensor to measure the color temperature during the image pick up process.

9. An apparatus according to claim 7, wherein said control circuit causes said color measuring sensor to measure the color temperature for a fixed period.

10. An apparatus according to claim 7, further comprising a flash device to irradiate said field with a flash of light, and wherein said control circuit causes said color measuring sensor to measure the color temperature during flashing of said flash device.

11. An apparatus according to claim 7, further comprising a flash device to irradiate said field with a flash of light, and wherein said control circuit causes said flash device to perform a pre-flash prior to said image pick up process, causes said color measuring sensor to start measuring the color temperature before completion of said pre-flash, and stops said pre-flash by said flash device and the color temperature measuring by said color measuring sensor prior to said image pick up process.

12. An apparatus for imaging a still-picture, comprising:
a manually operable photography starting switch to output a start-of-imaging signal;
an image pick up device to perform a still-picture image pick up process for picking up an image of a field and outputting an image signal;
a color measuring sensor to measure a color temperature of an area including said field and to output a color temperature signal;
an adjuster electrically connected to said image pick up device to adjust white-balance of said image signal based on said color temperature signal and to output a white-balanced image signal;
a recording device; and
a control circuit electrically connected to said photography starting switch, said image pick up device, said color measuring sensor, said adjuster and said recording device, said control circuit operating dependent upon said start-of-imaging signal to actuate said image pick up device and said color measuring sensor, to cause said adjuster to adjust white-balance of said image signal after said image pick up process and to cause said recording device to record said white-balanced image signal in a recording medium.

13. An apparatus according to claim 12, wherein said control circuit causes said color measuring sensor to measure the color temperature during the image pick up process.

14. An apparatus according to claim 12, wherein said control circuit causes said color measuring sensor to measure the color temperature for a fixed period.

15. An apparatus according to claim 12, further comprising a flash device to irradiate said field with a flash of light, and wherein said control circuit causes said color measuring sensor to measure the color temperature during flashing of said flash device.

16. An apparatus according to claim 12, further comprising a flash device to irradiate said field with a flash of light, and wherein said control circuit causes said flash device to perform a pre-flash prior to said image pick up process, causes said color measuring sensor to start measuring the color temperature before completion of said pre-flash, and stops said pre-flash by said flash device and the color temperature measuring by said color measuring sensor prior to said image pick up process.

* * * * *